(12) United States Patent
Schultheiss

(10) Patent No.: US 6,409,250 B1
(45) Date of Patent: Jun. 25, 2002

(54) MOTOR VEHICLE DOOR WITH A DOOR BODY SEPARATED INTO A WET AREA AND A DRY AREA

(75) Inventor: Wolfgang Schultheiss, Ebersdorf (DE)

(73) Assignee: BROSE Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/712,689

(22) Filed: Nov. 13, 2000

(30) Foreign Application Priority Data

Nov. 13, 1999 (DE) .......................................... 199 54 648

(51) Int. Cl.$^7$ ................................................. B60J 5/00
(52) U.S. Cl. ...................................... 296/146.7; 49/502
(58) Field of Search ........................ 296/146.1, 146.7; 49/502; 442/85, 414

(56) References Cited

U.S. PATENT DOCUMENTS 5,298,694 A * 3/1994 Thompson et al. ......... 181/286
5,886,296 A * 3/1999 Ghorbani et al. ............. 174/50
5,902,004 A * 5/1999 Waltz et al. .............. 296/146.9
6,185,872 B1 * 2/2001 Seeberger et al. ............ 49/502
6,226,927 B1 * 5/2001 Bertolini ....................... 49/502

FOREIGN PATENT DOCUMENTS

DE          196 22 310         12/1997

* cited by examiner

Primary Examiner—Stephen T. Gordon
Assistant Examiner—Patricia Engle
(74) Attorney, Agent, or Firm—Christie, Parker & Hale, LLP

(57) ABSTRACT

A motor vehicle door has a door body separated by a separator into a wet area and a dry area, whereby the wet area is bounded on one side by an outer door panel and on the other side by the separator. The dry area bounds the separator in a direction towards the vehicle interior and the separator comprises an area-permeable pressure equalization element. The pressure equalization element is air-permeable at least from the side of the dry area in a direction towards the wet area and is water- and dust-impermeable in the opposite direction. The wet-area side of the pressure equalization element preferably has a low affinity for water and dust.

18 Claims, 5 Drawing Sheets

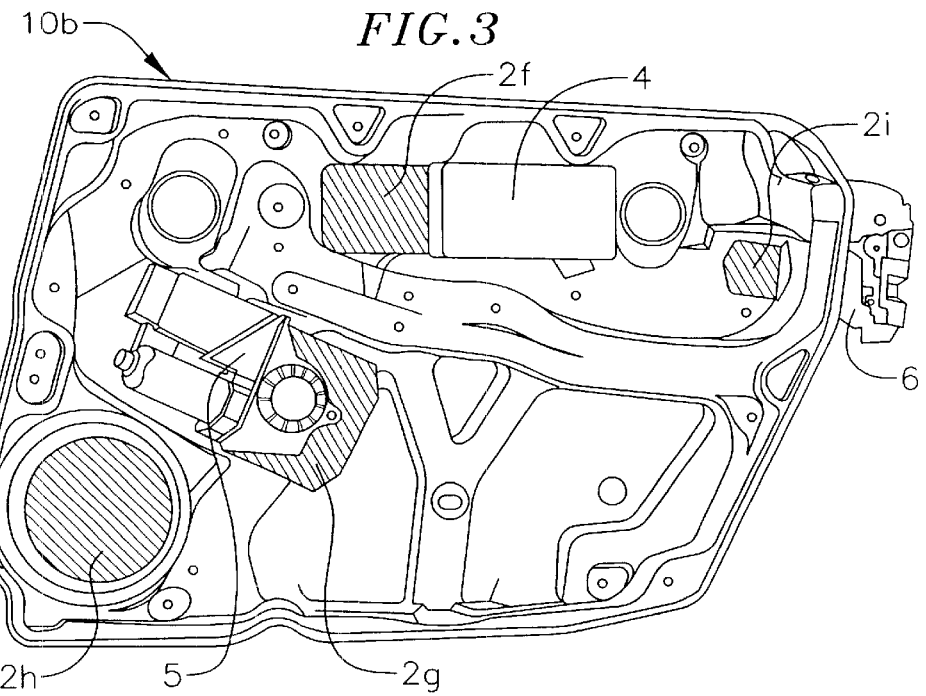
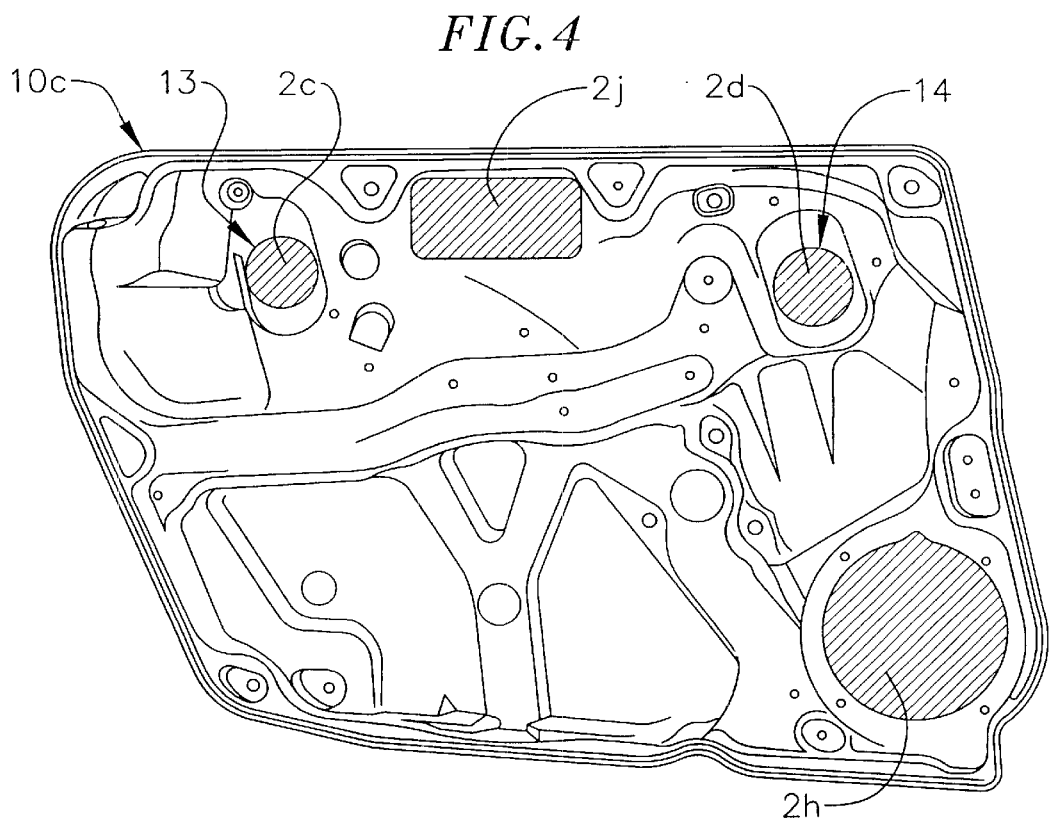

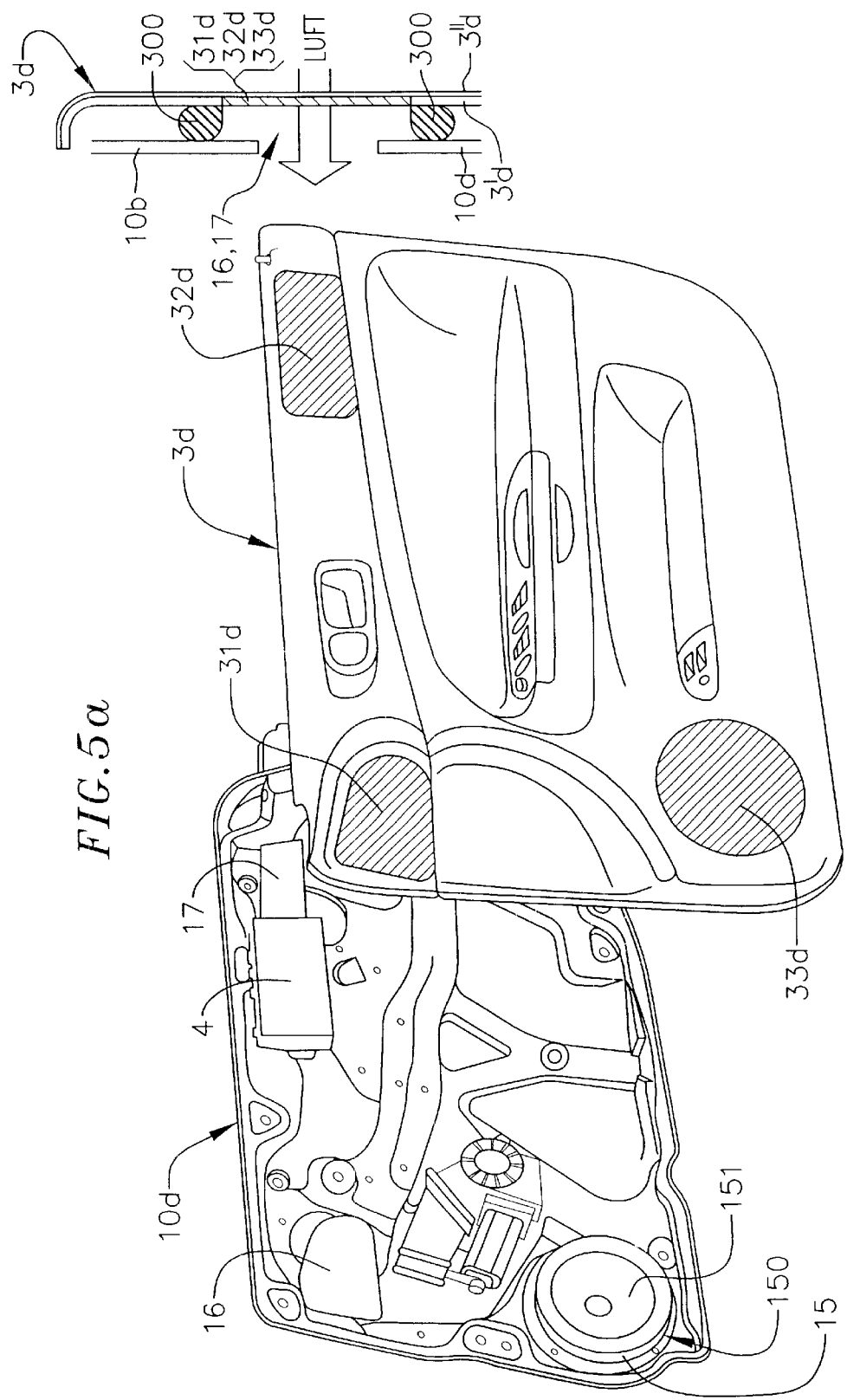

MOTOR VEHICLE DOOR WITH A DOOR BODY SEPARATED INTO A WET AREA AND A DRY AREA

FIELD OF THE INVENTION

The present invention is directed to a motor vehicle door, and more particularly, to a motor vehicle door having a door body separated into a wet area and a dry area by a hermetic separator.

BACKGROUND

The term "dry area of a motor vehicle door" here means that region of the motor vehicle door which bounds the vehicle interior (passenger compartment) or forms of boundary between a door lining and the wet/dry area separator.

Motor vehicle doors which have no wet/dry area separator or only a low-quality (e.g., foil type) wet/dry area separator are equipped with electrical aggregates and electrical plug connections exclusively in so-called wet area design, which results in higher costs in comparison with the dry area design. Moreover, the passage of moisture and dust into the passenger compartment results in a degradation of the compartment climate.

In contrast, in the case of motor vehicle doors with a virtually hermetic wet/dry area separator, the passage of moisture and dust into the passenger compartment is prevented such that the compartment climate is not impaired, and all electrical as well as electronic components can be constructed in dry area design. On the other hand, a comparatively high level of water can develop in the wet area of the motor vehicle door during rain and relatively fast driving because of the underpressure which develops there. This underpressure prevents the water from being able to drain out through the openings in the bottom of the door unobstructed. With an increasing level of water, the requirements on the seals in the flooded region increase. Moreover, at high speeds very high turbulence develops in the wet area of the motor vehicle door, which distributes fine water droplets in the entire wet area such that an opening in the wet/dry area separator even for the purpose of pressure equalization would result in an unacceptable degradation of the dry area conditions if it were arranged in the window parapet area.

A motor vehicle of the type described is disclosed in DE 196 22 310 A1.

SUMMARY OF THE INVENTION

It is thus an object of the invention to guarantee high-quality wet/dry area separation, and at the same time, achieve an effective lowering of the inherent anticipated maximum water level.

The present invention is directed to a motor vehicle door having a door body separated into a wet area and a dry area by a separator. Accordingly, the element constituting the wet/dry area separator of the motor vehicle door, in particular the door lining and/or a corresponding separator element, has at least one air-permeable pressure equalization element. This may be integrated directly into the wet/dry area separator, i.e., be a component of the wet/dry area separator. It is possible that the wet/dry area separator as a whole be designed as a pressure equalization element.

The pressure equalization element is air-permeable from the side of the dry area in the direction of the wet area and water and dust-impermeable in the opposite direction (from the wet-area side in the direction of the dry area). To this end, the wet-area side of the pressure equalization element has the least possible affinity for water and dust. In preferred embodiments, the pressure equalization element comprises fabrics made of hydrophobic fibers. In alternative embodiments, other fabrics which are provided on the wet-area side with a coating of the hydrophobic substance could also be used. Moreover, the pressure equalization element may also be formed from a gas-permeable diaphragm preferably made of a hydrophobic substance.

Of course, to ensure the function desired, care must be taken that an adequately large volume of airflow can flow from the passenger compartment into the dry area. This may occur through the edge region of the door lining or through passages provided especially for this at other locations, whereby these passages can preferably be covered with an air-permeable coating having a low water resistance.

In order to always be able to be effectively use the entire surface of the pressure equalization element, this should be positioned as much as possible completely above an assumed maximum standing water line. The decrease in pressure obtainable is greater the higher the volume of airflow through the pressure equalization element. Consequently, the pressure equalization element should form as large a share as possible of the wet/dry area separator. An increase in capacity can also be achieved by lowering the specific pressure loss of the pressure equalization element.

A preferred embodiment of the invention provides that the pressure equalization component is a functional unit installable in an opening of the door lining or in the separation element. It seems particularly advantageous to use a speaker diaphragm based on a substance with the properties described. Thus, the technical objective can be achieved without any added expense.

According to a second embodiment, the pressure equalization element constitutes a part of a housing of a functional unit, such as a gear housing, an airbag housing, or even a closing element of an assembly opening. The integration of the pressure equalization element into functional units which, can be preassembled and tested outside the motor vehicle door, ensures comparatively simple and reliable producibility and handleability.

Another embodiment of the invention provides for integrating the pressure equalization element into the door lining, whereby an opening between the wet area and the dry area is closed by the installation of the door lining on the vehicle door. To this end, the pressure equalization element and the opening in the wet/dry area separator should be surrounded by an intermediate elastic seal. If the material of the pressure equalization element is suitable for use for design elements, e.g., based on a fabric coated on one side, the entire door lining or parts thereof can be coated with the special fabric. A larger number of small perforations in the basic body of the door lining or a porous basic body inner lining with pores open all the way through guarantees the passage of air.

According to an another alternative embodiment, the pressure equalization element may also be a component of a foam sheet, which is preferably pressed from the dry-area side onto the entire surface of a mechanical support (e.g., door lining or support plate of a door module) provided as a sealing element and thus forms the actual wet/dry area separator. In this case, an opening for the pressure equalization element is arranged in the mechanical support.

The pressure equalization element may also serve to exhaust the gases contained in the airbag after deployment of an airbag. Moreover, based on the venting capability provided by the pressure equalization element, pressure is equalized between the vehicle door and vehicle interior and the closing of the motor vehicle door is facilitated. This makes separate ventilation openings for this purpose unnecessary.

BRIEF DESCRIPTION OF THE DRAWINGS

These and other features and advantages of the present invention will be better understood by reference to the following detailed description when considered in conjunction with the accompanying drawings wherein:

FIG. 3 is a front view of a support plate of a door module, according to the present invention, with functional elements whose housing has an additional area equipped with a pressure equalization element which closes an opening in the support plate;

FIG. 4 is a rear view of a support plate of a door module, according to the present invention, with a separate pressure equalization element provided in the window parapet area;

FIG. 5a is an exploded view of a support plate of a door module with openings to which pressure equalization elements of the door lining area assigned;

FIG. 5b is a cross-sectional schematic view of the door module support of FIG. 5a and a door lining.

DETAILED DESCRIPTION

Figure 1:
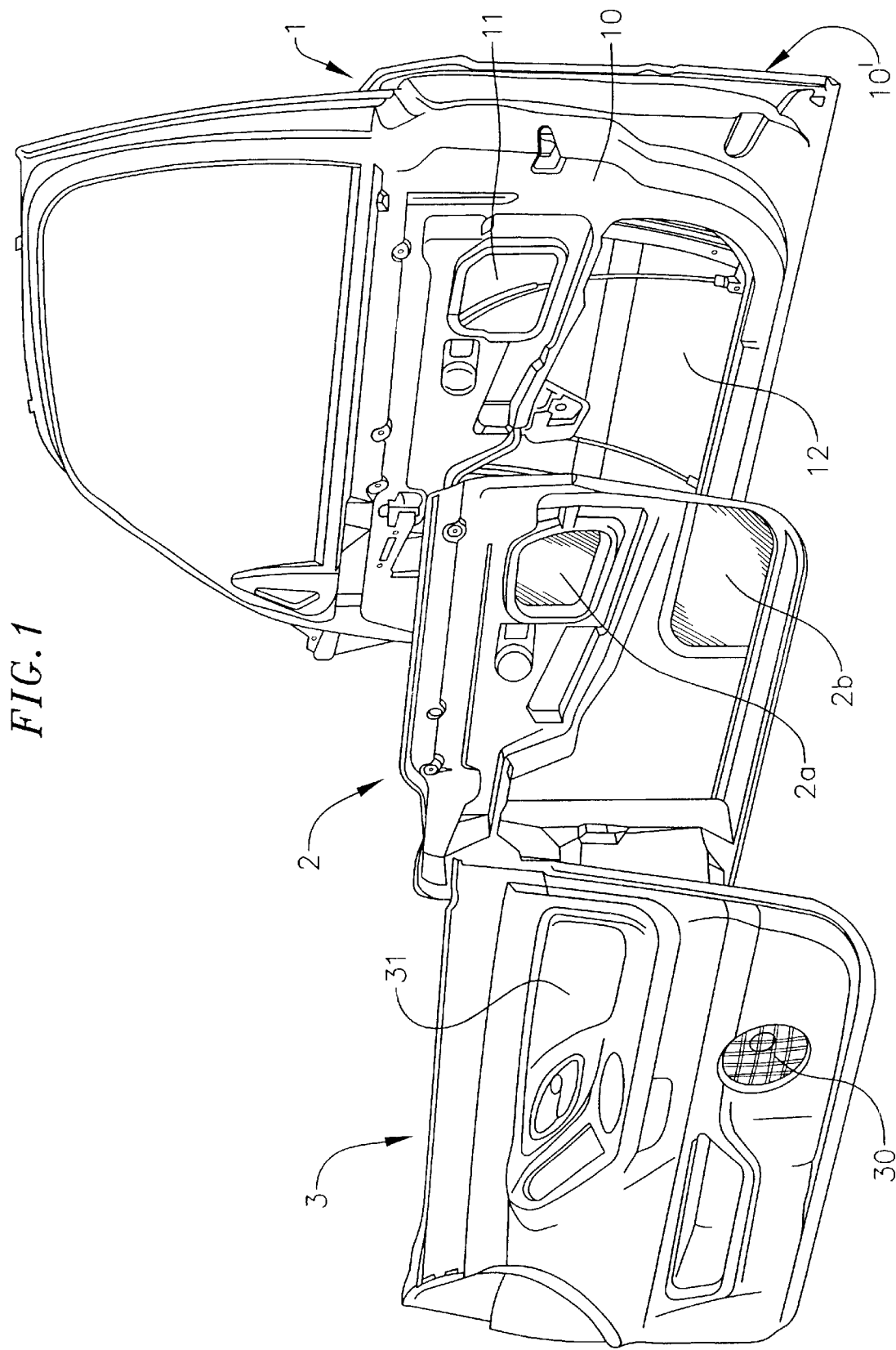
FIG. 1 is a perspective exploded view of a door body, a foam sheet as a wet/dry area separator with pressure equalization elements and a door lining of the present invention.

FIG. 1 depicts a door body 1 of the present invention. The body is formed from an exterior panel 10' and an interior panel 10. The interior panel 10 has assembly openings 11 and 12 for the incorporation of functional elements, such as a window regulator and/or a door lock. An air and water-impermeable foam sheet 2 having two partially inserted pressure equalization elements 2a, 2b is provided as a wet/dry area separator, whereby the upper pressure equalization element 2a precisely covers the assembly opening 11, whereas the lower pressure equalization element 2b only partially covers the assembly opening 12 and is drawn in the direction of the wet area in order to be able to accommodate the speaker 30 mounted on the door lining 3. In a region 31 of the door lining 3 overlaying the pressure equalization element 2a, an air-permeable covering is provided to keep the water resistance as low as possible. If the flow of air from this region 31 to the lower pressure relief element 2b is not readily possible, an air passage must also be guaranteed in the lower region of the door lining 3. This may also occur through an appropriately designed attachment region of the speaker 30, for example, by leaving a ventilation gap between the speaker 30 and the door lining 3.

Reference is made at this point to the fact that it is, in principle, possible to design the entire wet/dry area separator 2 as a pressure equalization element. In this case, an air-permeable foam sheet with pores, which is coated on the wet-area side with a coating for the purpose of pressure equalization with simultaneous sealing against moisture in the direction of the dry area must be selected as a support.

The underpressure created in the wet area of the vehicle door at high driving speeds can be significantly reduced by the use of the pressure equalization element 2a, whereby during rain, the maximum possible water height in the wet area is accordingly lower. Thus, a relatively larger structural area not threatened by flooding is available. On the other hand, the sealing measures can be made simpler and less expensive with reduced static water pressure.

Figure 2:
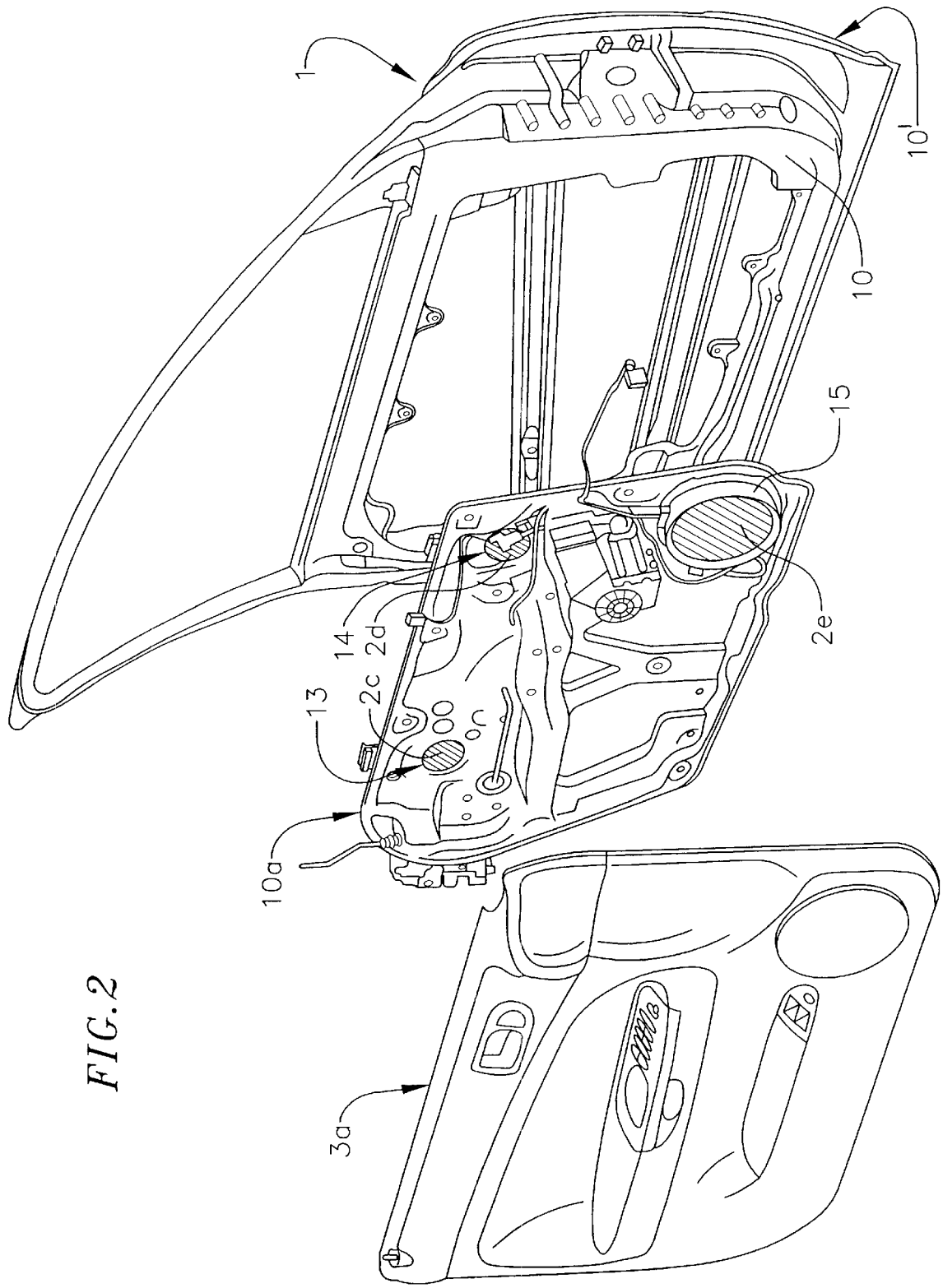
FIG. 2 is an exploded view of a vehicle door of the present invention having a support plate of a door module with pressure relief elements for the closing of openings.

A vehicle door according to FIG. 2 has a door module support 10a, on which a large number of functional units, in particular a window regulator, a lock, a speaker, an electronic control unit, as well as a cable harness can be preassembled. Two assembly openings 13 and 14, through which the window pane is attached to the mechanics of the window regulator, are incorporated into the support plate 10a. After completion of assembly, the openings 13 and 14 are closed with covers 2c and 2d, which are designed as pressure equalization elements. If the support plate 10a is not to be equipped with a speaker, the opening in the support ring 15 provided for this may also be closed with a pressure equalization element 2e. The door lining 3a is designed to be at least partially adequately air-permeable.

FIG. 3 depicts an alternative embodiment support plate lob of the vehicle door. This support plate 10b is equipped with a drive device 5 for a window regulator and a side airbag 4, whose housings have an additional formed area with a pressure equalization elements 2f and 2g. The lock support attached on the wet-area side of the support plate 10b also has a pressure equalization element 2i which covers a corresponding opening in the support plate 10b. With this variant of the invention, it is possible to prefabricate the pressure equalization elements 2f, 2g and 2i in conjunction with various functional elements and close the openings provided there simultaneously with air installation on the support plate 10b.

According to the embodiment of FIG. 4, an opening is provided in the window parapet area of the support plate 10c to accommodate a pressure equalization element 2j. Moreover, the assembly openings 13 and 14, as well as the speaker opening area are equipped with pressure equalization elements 2c, 2d and 2h.

FIG. 5a depicts a support plate 10d outfitted with functional units having ventilation openings 16 and 17, that correspond with pressure equalization elements 31d, 32d of the door lining 3d. From the sectional view of FIG. 5b, it is discernible that sealing elements 300 formed on the edge of the pressure equalization element 31d and 32d completely surround the openings 16 and 17. The same is also true for the speaker ring 15 if no speaker 150 is to be provided and the corresponding opening 33d is closed by the pressure equalization element. The door lining is made of an interior support material 3'd and an external coating material 3"d which is readily permeable to air.

According to an alternative embodiment, provision is made to manufacture the diaphragm 151 of a speaker from a material air-permeable from the dry-area side in the direction of the wet area and water and dust-impermeable in the opposite direction, such that the diaphragm 151 itself can function as a pressure equalization element. In this embodiment, the region 33d must be designed as an air-permeable cover.

Figure 6:
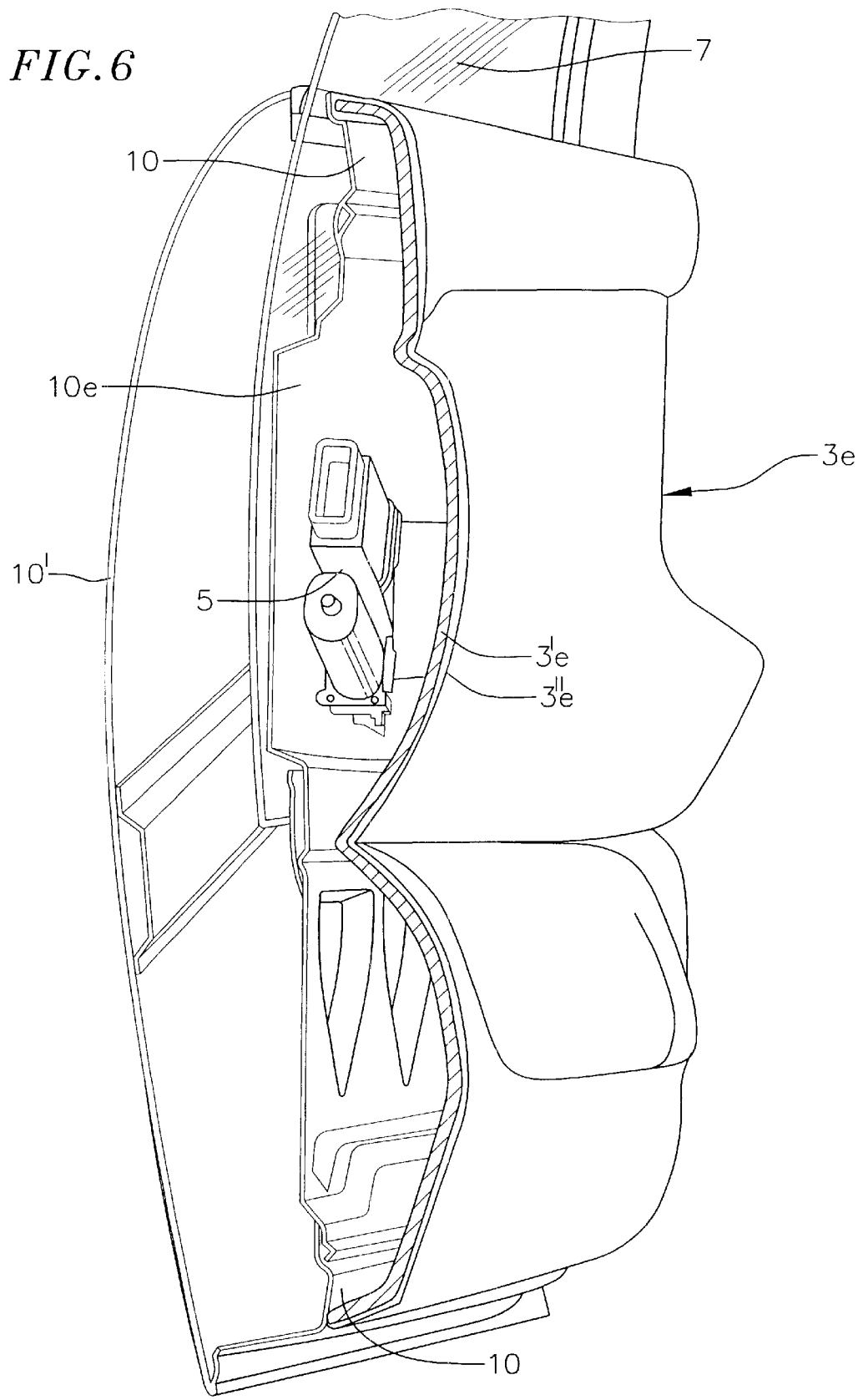
FIG. 6 is a cross-sectional view of a vehicle door according to the present invention with a door lining designed as a pressure equalization element.

The cross-section through the vehicle door according to FIG. 6 depicts a door lining 3e which is completely designed as a pressure equalization element. Here, the external visible surface forms the decorative surface and the inner sheet represents the boundary layer between the wet area and the dry area. Openings for the passage of air, which are clearly positioned above the maximum anticipated standing water line and are formed or arranged protected from water spray such that no (liquid) water can pass over into the space between the support plate 10e and the door lining 3e, are provided in the support plate 10e.

what is claimed is:

1. A motor vehicle door comprising a door body separated by a separator into a wet area and a dry area, whereby the wet area is bounded on one side by an outer door panel and on the other side by a first side of the separator, the dry area is bounded by at least a second side of the separator opposite the first side of the separator and extends in a direction towards the vehicle interior, wherein the separator includes an air-permeable pressure equalization element.

2. The motor vehicle of claim 1, wherein the pressure equalization element is at least air-permeable in a direction passing from the dry-area side to the wet area side, and is water-impermeable in the opposite direction.

3. The motor vehicle door of claim 2, wherein the wet area side of the pressure equalization element has minimum affinity to water and dust.

4. The motor vehicle door of claim 2, wherein the pressure equalization element is formed from a fabric made of hydrophobic fibers.

5. The motor vehicle door of claim 2, wherein the pressure equalization element is formed from a fabric having a coating of a hydrophobic substance on the wet area side.

6. The motor vehicle door of claim 2, wherein the pressure equalization element is formed from a diaphragm made of a hydrophobic substance.

7. The motor vehicle door of claim 1, wherein the pressure equalization element is arranged completely above a predetermined maximum standing water line.

8. The motor vehicle door of claim 1 further comprising a functional unit connectable to one of a door lining and the separator, wherein the pressure equalization element is a component of the functional unit.

9. The motor vehicle door of claim 8, wherein the pressure equalization element is formed from a diaphragm of a speaker.

10. The motor vehicle door of claim 8, wherein the pressure equalization element is part of a housing of the functional unit.

11. The motor vehicle door of claim 1, wherein an additional zone is formed on the housing of the functional unit and is provided with the pressure equalization element, whereby this additional zone covers a corresponding opening in one of the door lining, a support plate, and other separation element.

12. The motor vehicle door of claim 11, wherein a drive unit of a window regulator is associated with the additional zone.

13. The motor vehicle door of claim 11, wherein the additional zone is associated with a side airbag.

14. The motor vehicle of claim 11, wherein the additional zone is associated with a holder for a door lock.

15. The motor vehicle of claim 1, wherein the pressure equalization element closes an assembly opening between the wet area and the dry area.

16. The motor vehicle door of claim 1, wherein the pressure equalization element is a component of a door lining and closes an opening between the wet area and the dry area.

17. The motor vehicle door of claim 1, wherein the pressure equalization element is a component of a foam sheet provided as a sealing element and closes an opening between the wet area and the dry area.

18. The motor vehicle door of claim 1, wherein the separator is formed from a support plate of a door module, which sealingly covers a large cutout in a door lining and supports a plurality of functional components.

* * * * *